US006259589B1

United States Patent
Chao

(12) United States Patent
(10) Patent No.: US 6,259,589 B1
(45) Date of Patent: Jul. 10, 2001

(54) PROTECTION APPARATUS APPLIED TO A TELEPHONE LINE

(75) Inventor: Chun-Chen Chao, Taipei Hsien (TW)

(73) Assignee: Twinhead International Corp., Hsintien (TW)

( * ) Notice: Subject to any disclaimer, the term of this patent is extended or adjusted under 35 U.S.C. 154(b) by 0 days.

(21) Appl. No.: 09/322,052

(22) Filed: May 27, 1999

(51) Int. Cl.[7] .................................................... H02H 1/00
(52) U.S. Cl. ............................................. 361/119; 361/103
(58) Field of Search ........................... 361/56, 58, 93.8, 361/93.9, 103, 106, 111, 119; 379/32, 315, 317, 331, 412

(56) References Cited

U.S. PATENT DOCUMENTS 5,812,658 * 9/1998 Cotreau et al. ......................... 379/377

FOREIGN PATENT DOCUMENTS

03235455 * 10/1991 (JP) ................................. H04M/1/00
10023108 * 1/1998 (JP) ................................. H04M/1/00

* cited by examiner

Primary Examiner—Ronald W. Leja
(74) Attorney, Agent, or Firm—Jiawei Huang

(57) ABSTRACT

A protection device applied to a telephone line comprises at least an overload detecting device, a high temperature detecting circuit, and an enforcing on-hook means. When an abnormal over voltage or over current occurs, it can be detected by the overload detecting device. An overload signal is output to the enforcing on-hook device. Or when the temperature of a fax/modem machine raises abnormally, it can be detected by the high temperature detecting circuit. A high temperature signal is then output to enforcing on-hook device. While the enforcing on-hook device receives the overload signal or the high temperature signal, the system is on hook.

11 Claims, 4 Drawing Sheets

PROTECTION APPARATUS APPLIED TO A TELEPHONE LINE

BACKGROUND OF THE INVENTION

1. Field of the Invention

The invention relates in general to a circuit protection apparatus. More particularly, to a protection apparatus applied to a telephone line.

2. Description of the Related Art

As the science technology becomes more and more advanced, the mutual relationship between each individual becomes more and more frequent and relative. Telephones, fax machines, modems and other appliances for telephones are necessary for daily life. Under the circumstances such as erroneously plugging a telephone connector into an integrated service digital network (ISDN) socket, malfunction of the private branch exchanger (PBX) and telephone line failure of the telephone office would cause an abnormal high voltage or current. Any appliance connected to the telephone line is very likely to be damaged by the abnormal high voltage or current. Referring to FIG. 1, a conventional protection device for a telephone line is shown. The telephone line is connected from a socket 40. The connection status of the telephone line is determined by a signal sent from a fax/modem controller 12 to hook switch 14. The protection device is implemented by connecting a fuse or poly switch 10 to the telephone line in series. When an abnormal over voltage or over current occurs, the fuse or poly switch 10 is blown out. A new fuse or poly switch has to be installed to replace the blown one to retrieve a normal operation of the fax/modem machine. It is thus very inconvenient to practical application. In European standard, a current limit circuit 20 has to be included in the circuit of the modem/fax machine. As a consequence, while an over current occurs, a current flowing though is restricted within a certain magnitude to cause a blowout of a transistor set 30 due to an over voltage, high temperature, or even high temperature of the enclosure. The protection performance is thus very limited.

SUMMARY OF THE INVENTION

Accordingly, the invention provides a protection apparatus applied to a telephone line. The protection apparatus is applied to a direct access arrangement (DAA) circuit. When an abnormal over voltage or over current occurs, an overload detecting means can detect the over voltage or current and send an overload signal to the enforcing on-hook means. Or when the temperature of the telephone line raises abnormally high, it is detected by the high temperature detecting means and a high temperature signal is output to the enforcing on-hook means. While receiving the overload signal or high temperature signal, the telephone line is hooked on by the hook switch. As the driver of the fax/modem machine detects that there is no carrier on the telephone line, the DAA is enforced to be on-hook. The phenomenon of device blowout due to over voltage or high temperature is thus prevented.

In an embodiment of the invention, a protection apparatus applied and coupled to a telephone line is provided. The protection apparatus comprises a bridge rectifier, an overload detecting means, an enforcing on-hook means, and a hook switch. The bridge rectifier has an input terminal coupled with the telephone line. The telephone line voltage is input to the bridge rectifier. The input telephone line voltage is rectified as a rectified voltage output to an overload detecting means which is coupled to the output terminal of the bridge rectifier. When the rectified voltage exceeds a predetermined magnitude, an overload signal is output by the overload detecting means. The enforcing on-hook means is coupled to the overload detecting means which connected to the telephone line in series. When the overload signal is input to the enforcing on-hook means, an on-hook operation is performed.

In another embodiment of the invention, a protection circuit applied to a fax/modem machine is provided to avoid an abnormal high temperature. The detecting circuit is used to detect the temperature of the fax/modem machine. When the temperature exceeds a predetermined value, an overload signal is output. An enforcing on-hook means is coupled to the detecting circuit to generate an on-hook signal according to the overload signal. The enforcing on-hook means is further connected to the telephone line in series, so as to perform an on-hook operation of the telephone line.

Both the foregoing general description and the following detailed description are exemplary and explanatory only and are not restrictive of the invention, as claimed.

DESCRIPTION OF THE PREFERRED EMBODIMENTS

Figure 1:
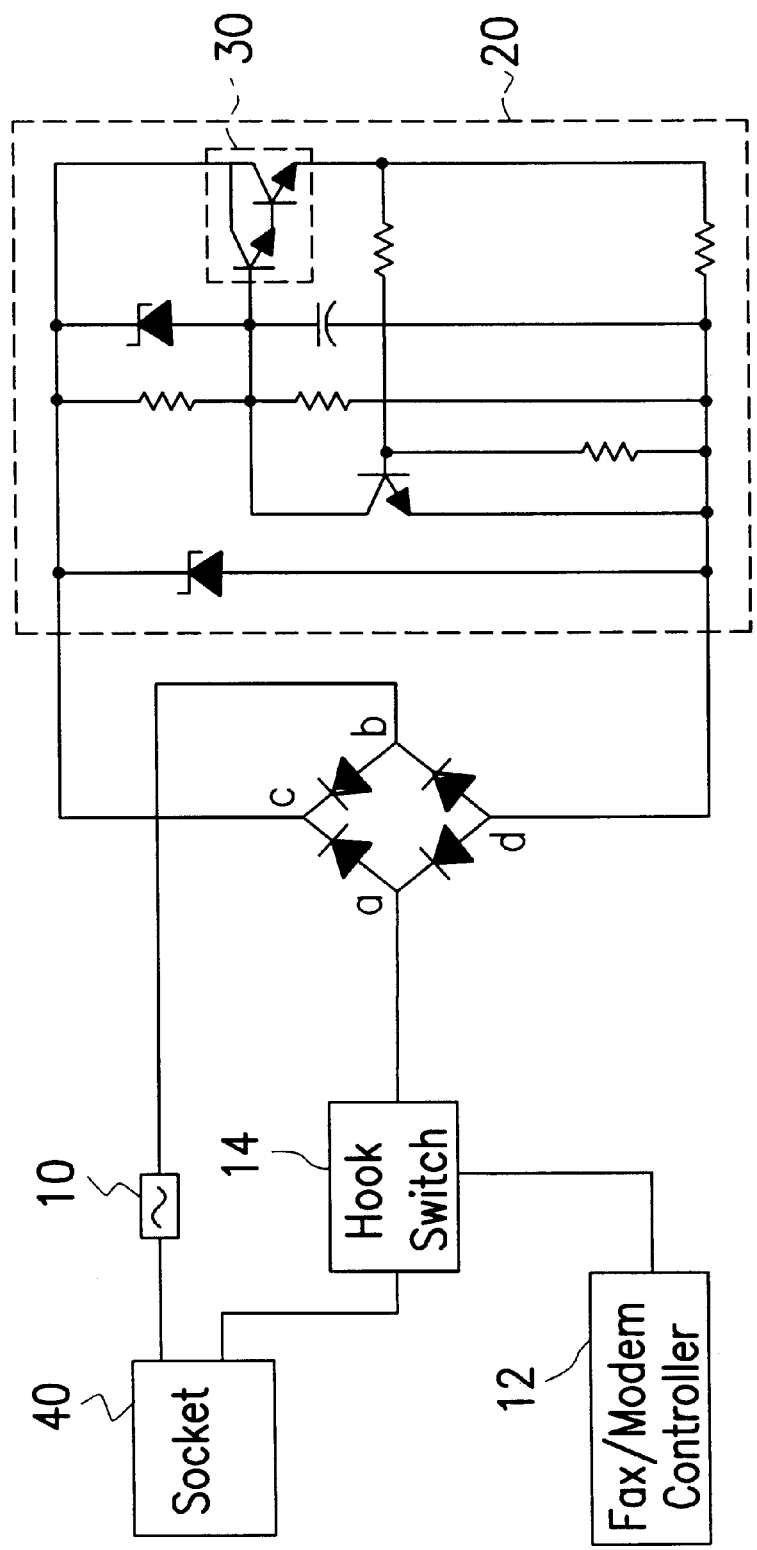
FIG. 1 shows a conventional protection and current limit circuit of a telephone.
Figure 2:
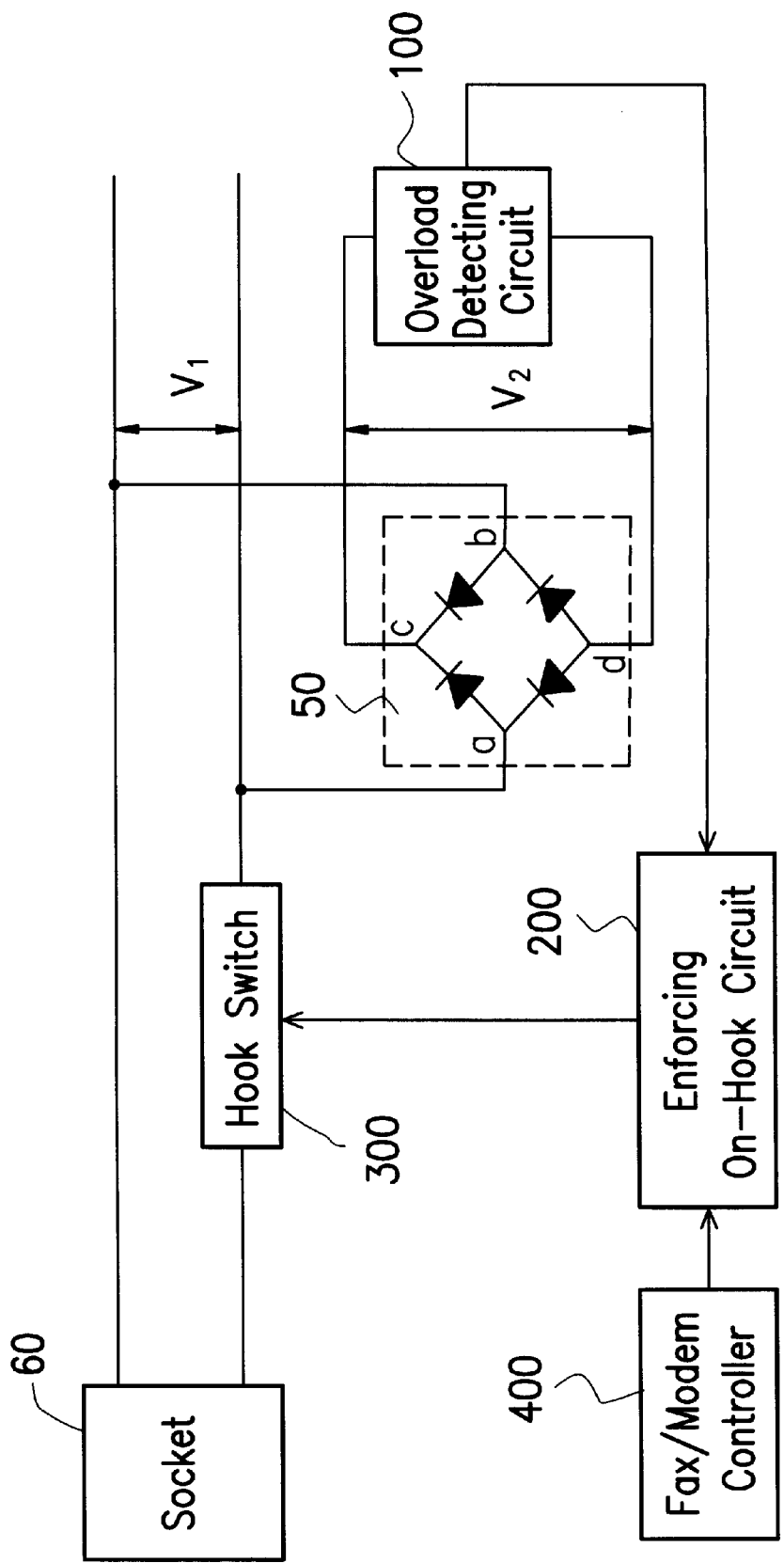
FIG. 2 shows a block diagram of an over voltage or over current protection apparatus applied to a telephone line according to the invention.

In FIG. 2, an over voltage or over current protection apparatus for a fax/modem machine connected to a telephone line of this invention is shown. The telephone line is connected from a socket 60 to nodes a and b of the bridge rectifier 50. A telephone line voltage is thus input to the bridge rectifier 50 to be rectified as a rectified voltage $V_2$. Using the nodes c and d as output nodes, the rectified voltage $V_2$ is output from the bridge rectifier 50 and input to an overload detecting means 100. If under circumstances such as erroneously plugging the telephone line connector into an ISDN socket, malfunction of PBX, or telephone line failure of the telephone office happens, an abnormal over voltage or over current is generated. The abnormal over voltage or over current is detected by the overload detecting means 100 through a diagnosis of the bridge rectifier 50. Meanwhile, an overload signal is output from the overload detecting means 100 to an enforcing on-hook means 200 coupled to both overload detecting means 100 and the telephone line. While the enforcing on-hook circuit 200 receives the overload signal, an off-hook signal from a hook switch of the fax/modem machine is charged into an on-hook signal. In one embodiment of the invention, the hook switch 300 comprises a relay. When the off-hook signal is transmitted to the hook switch 300, the telephone line is connected by the hook switch 300. On the contrary, while the on-hook signal is transmitted to the hook switch 300, the hook switch 300 disconnects the telephone line.

Figure 3:
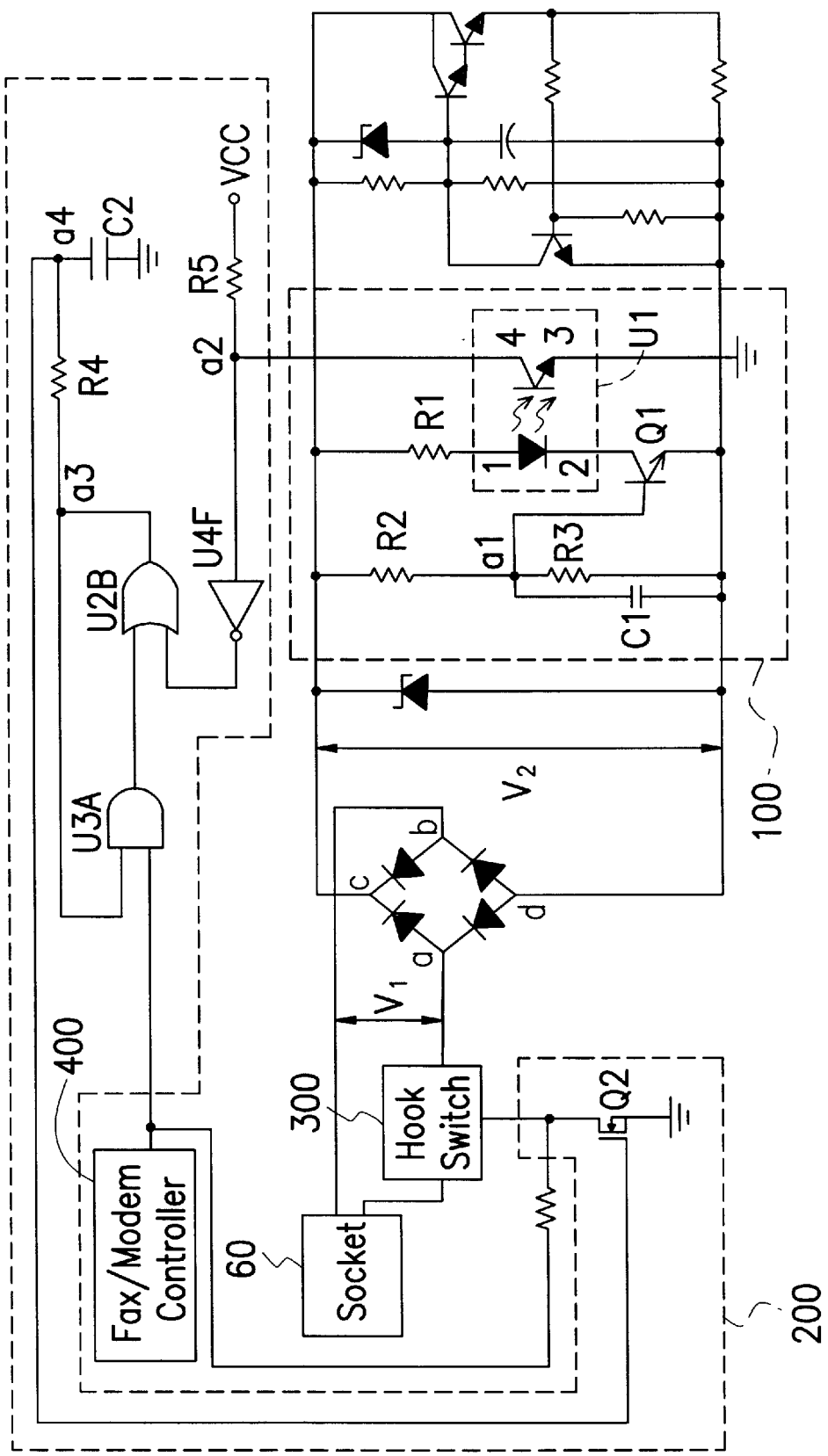
FIG. 3 shows a circuit of the over voltage or over current protection apparatus according to the invention.

A circuit diagram of the protection apparatus for over voltage or over current of a fax/modem machine of the present invention is shown as FIG. 3. In the embodiment, the off-hook signal of the hook switch 300 is a high voltage level signal which activates a magnet coil and connects a switch of the relay. The telephone line is thus connected via the switch. That is, while the hook switch 300 receives an off hook signal, the telephone line is connected via the hook switch 300. In contrast, the on-hook signal is a low voltage level which does not activate the magnet coil, so that the switch of the relay is not connected thereby. That is, when the on-hook signal is sent to the hook switch 300, the telephone line is cut off via the hook switch 300. The overload detecting means 100 comprises resistors R1, R2, R3, a capacitor C1, a transistor Q1, and a photo-coupler U1. The resistor R2 is coupled to a positive output terminal c of the bridge rectifier 50 and a node a1. The resistor R3 is coupled with the node a1 and a negative output terminal d of the bridge rectifier 50. The capacitor C1 is connected to the node a1 and the negative output terminal d of the bridge rectifier. The photo-coupler U1 has a third lead 3 connecting to ground and a fourth lead 4 connecting to the enforcing on-hook means 200. The resistor R1 is coupled to the positive terminal c of the bridge rectifier 50 and a first lead 1 of the photo-coupler U1. The transistor Q1 has a collector coupled with a second lead 2 of the photo-coupler U1, an emitter coupled to the negative output terminal d of the bridge rectifier 50, and a base coupled to the node a1. The base of the transistor Q1 has a base voltage provided by a potential dividing circuit of the resistors R2 and R3. When the base voltage reaches about 0.65V, the transistor Q1 is electrically turned on, so that a diode of the photo-coupler U1 is electrically turned on and further coupled to a transistor in the photo-coupler U1, so as to electrically connect the third and fourth leads 3, 4 of the photo-coupler U1. Since the third lead 3 is connected to ground, so that the ground low voltage signal is the overload signal.

The enforcing on-hook means 200 comprises resistors R4, R5, a capacitor C2, an OR gate U2B, an AND gate U3A, an inverter U4F, and a transistor Q2. The pull-up resistor R5 is coupled to a power source Vcc and a node a2 which further connects with the overload detecting means 100. The inverter U4F has an input terminal connecting to the node 21 and an output terminal to an input terminal to an input terminal of the OR gate U2B. The OR gate U2B further comprises an output terminal connecting to a node a3. The AND gate U3A has an input terminal coupled to the node a3, the other input terminal to a fax/modem controller 400 and an output terminal to the other input terminal of the OR gate U2B. The resistor R4 is coupled with the nodes a3 and a4. The capacitor C2 is coupled with the node a4 and ground. The transistor Q2 has a gate coupled with the node a4, a source coupled to ground, and a drain coupled to both the hook switch 300 and the fax/modem controller 400. The resistor R5 comprises a pull-up resistor. When an overload signal with a low voltage is an input of the inverter U4F, the inverter U4F has an output of a high voltage. The high voltage is then output from the inverter U4F and input to the OR gate U2B, the output of the OR gate U2B is then a high voltage. Passing through an RC charging circuit constructed by the resistor R4 and the capacitor C2, the high voltage start charging the capacitor C2. Being charged a time period of $\frac{1}{2}\pi R_4 C_2$, the voltage of the capacitor C2 is high enough to electrically turn on the transistor Q2. Meanwhile, the input signal of the hook switch 300 turns to be a low voltage, so that an on-hook operation is performed, and the telephone line is cut off.

Figure 4:
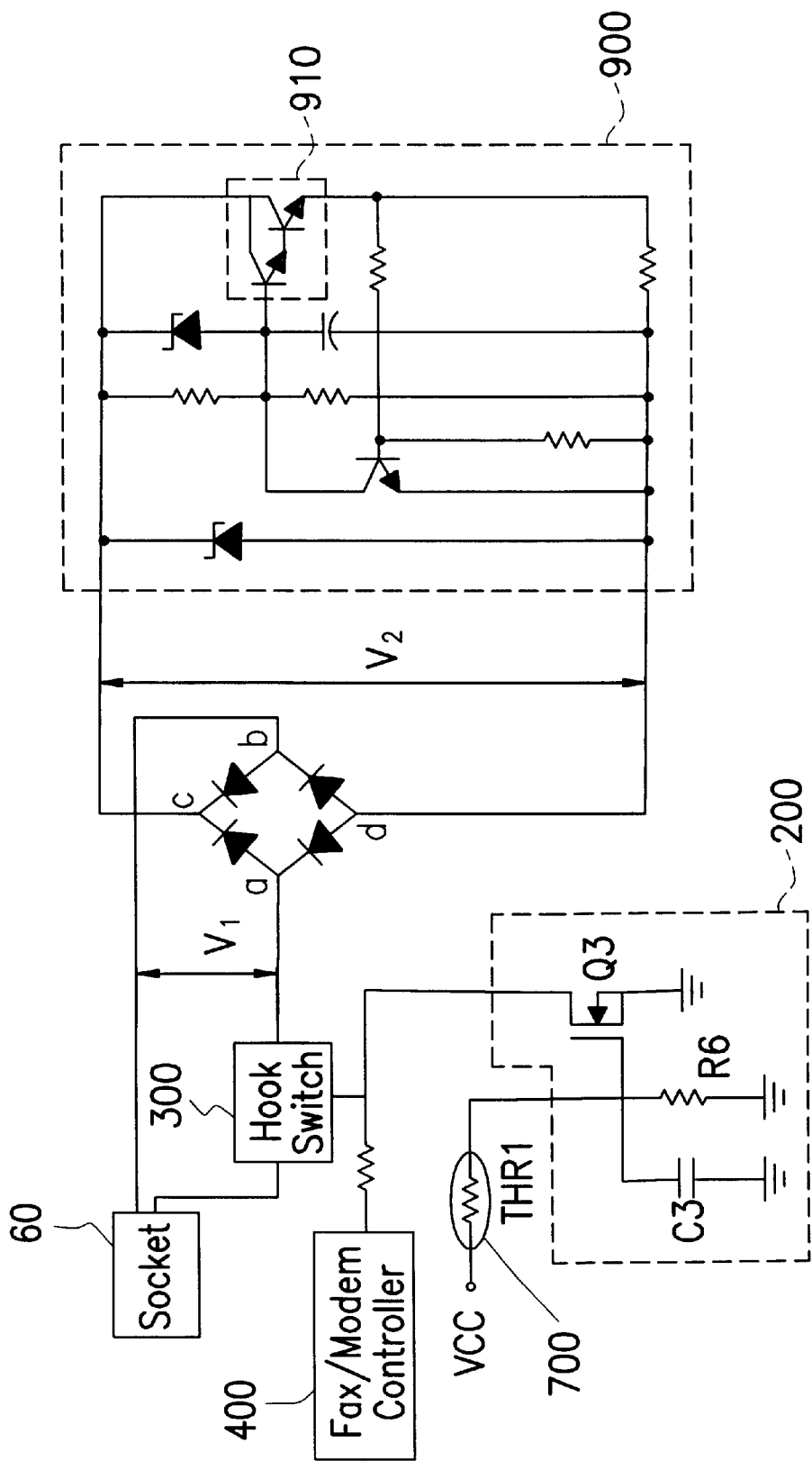
FIG. 4 shows a high temperature protection circuit diagram according to the invention.

In FIG. 4, a high temperature protection apparatus used for a telephone line of a fax/modem machine is shown. A detecting means 700 comprises a thermo-sensitive resistor THR1 which is installed in the fax/modem machine in a position at which an abnormal temperature raise is likely to occur. For example, in this embodiment, the thermo-sensitive resistor THR1 is disposed next to a set of transistors 910 of a current limit circuit 900. The temperature of current limit means 900 can thus be detected. An enforcing on-hook means 200 comprises a resistor R6, a capacitor C3, and a transistor Q3. The resistor R6 is connected to ground and a node a5 which further connects to the high temperature detecting circuit. The capacitor C3 is coupled to the node a5 and ground. The transistor has a gate couple to the node a5, a source to ground, and a drain to the hook switch 300 and the fax/modem controller 400. A gate voltage of the transistor Q3 is provided by a potential dividing circuit of the thermo-sensitive resistor THR1 and the resistor R6. When a high temperature occurs in the circuit, the thermo-sensitive resistor THR1 has a decreasing resistance, so that the gate voltage of the transistor is increased. When the temperature reaches to a certain limit, the gate voltage of the transistor Q3 is consequently increased to a certain value as a high temperature signal. The transistor Q3 is thus switched on due to the gate voltage. Meanwhile, the input signal of the hook switch 300 is a low voltage and the telephone line is cut off thereby.

Therefore, the invention provides a protection means applied to a telephone line of a fax/modem machine. Whenever an abnormal over voltage or current occurs, a detecting circuit can detect spontaneously to cut off the telephone line without causing any damage of the fax/modem machine.

In addition, the invention further provides a high temperature protection means. When an abnormal high temperature occurs in the circuit of the fax/modem machine, the telephone line is cut off by spontaneously detecting the abnormal temperature raise via a detecting circuit. Therefore, the fax/modem machines is not to be damaged by the high temperature.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An over voltage/current protection apparatus suitable for use in a telephone line, the protection apparatus being coupled with the telephone line which provides a telephone line voltage, the protection apparatus comprising:

a bridge rectifier, for rectifying the telephone line voltage into a rectified voltage and coupled to the telephone line;

overload detecting means, coupled to the bridge rectifier for receiving the rectified voltage, the overload detecting means outputting an overload signal when the rectified voltage exceeds a predetermined value or an overcurrent is detected;

enforcing on-hook means, coupled to the overload detecting means for receiving the overload signal, and outputting an on-hook signal according to the overload signal; and a hook switch, coupled to the on-hook means and connected to the telephone line in series, to perform an on-hook operation on a telephone according to the on-hook signal, wherein the overload detecting means comprises:
a first resistor (R2), coupled to a positive voltage output terminal of the bridge rectifier and a first node (a1);
a second resistor (R3), coupled to the first node (a1) and a negative output terminal of the bridge rectifier;

a first capacitor (C1), coupled to the first node (a1) and the negative voltage output terminal of the bridge rectifier;

a photo-coupler (U1), having a third lead coupled to ground and a fourth lead to the enforcing on-hook means;

a third resistor (R1), coupled to the positive output terminal of the bridge rectifier and a first lead of the photo-coupler;

a first transistor (Q1), having a collector connecting to a second lead of the photo-coupler, an emitter connecting to the negative output terminal of the bridge rectifier and a base connecting to the first node (a1).

2. The protection apparatus according to claim 1, comprising further a fax/modem controller to detect an operation status and output the on-hook signal.

3. The protection apparatus according to claim 2, wherein the photo-coupler is used to output the overload signal when the rectified voltage is higher than the pre-determined value.

4. The protection apparatus according to claim 1, wherein the enforcing on-hook means comprises:

a fourth resistor (R5), coupled to a voltage source (Vcc) and a second node (a2) which further connecting to the fourth lead of the photo-coupler (U1) of the overload detecting means;

an inverter (U4F), having an inverter input terminal coupled to the second node (a2) and an inverter output terminal;

an OR gate (U2B), having a first OR gate input terminal coupled with the inverter output terminal, an OR gate output terminal to a third node (a3) and a second OR gate input terminal;

an AND gate (U3A), having a first AND gate input terminal coupled to the third node (a3), a second AND gate input terminal coupled to a fax/modem controller, and an AND gate output terminal coupled to the second OR gate input terminal;

a fifth resistor (R4), coupled to the third node (a3) and a fourth node (a4);

a second capacitor (C2), coupled to the fourth node (a4) and ground;

a second transistor (Q2), having a gate coupled to the fourth node (a4), a source coupled to ground, and a drain coupled to both the hook switch and the fax/modem controller.

5. The protection apparatus according to claim 4, wherein the fifth resistor (R4) and the second capacitor (C2) form an RC charge/discharge circuit to delay a time for outputting the on-hook signal.

6. The protection apparatus according to claim 4, wherein the second transistor (Q2) forms a switch circuit to switch an off-hook signal output from the fax/modem controller to an on-hook signal.

7. The protection apparatus according to claim 1, wherein the hook switch comprises a relay.

8. A protection means to prevent a fax/modem machine coupled to a telephone line from being over heated, the protection means comprising:

a detecting circuit, for detecting a temperature of a fax/modem circuit and outputting a high temperature signal when the temperature exceeds a pre-determined value;

enforcing on-hook means, coupled to the detecting circuit for generating an on-hook signal according to the overload signal and an off-hook signal; and a hook switch, coupled to the enforcing on-hook means and connected to the telephone line in series, for performing an on-hook operation on a telephone according to the on-hook signal wherein the enforcing on-hook means comprises:

a resistor (R6), coupled to a node (a5) and ground, wherein the node (a5) further connects to the detecting circuit;

a capacitor (C3), coupled to the node (a5) and ground; and a transistor (Q3), having a gate coupled to the node (a5), a source coupled with ground, and a drain coupled with the hook switch and a fax/modem controller.

9. The protection means according to claim 8, wherein the detecting circuit comprises a thermo-sensitive resistor for outputting the high temperature signal when the temperature exceeds the pre-determined value.

10. The protection means according to claim 8, wherein the transistor (Q3) forms a switch circuit to convert an off-hook signal output by the fax/modem controller into an on-hook signal.

11. The protection means according to claim 8, wherein the hook switch comprises a relay.

* * * * *